US007066717B2

(12) United States Patent
Morrison et al.

(10) Patent No.: US 7,066,717 B2
(45) Date of Patent: Jun. 27, 2006

(54) CERAMIC MATRIX COMPOSITE AIRFOIL TRAILING EDGE ARRANGEMENT

(75) Inventors: Jay A. Morrison, Oviedo, FL (US); Harry A. Albrecht, Hobe Sound, FL (US); Yevgeniy Shteyman, West Palm Beach, FL (US); Thomas Barrett Jackson, Portland, OR (US)

(73) Assignee: Siemens Power Generation, Inc., Orlando, FL (US)

( * ) Notice: Subject to any disclaimer, the term of this patent is extended or adjusted under 35 U.S.C. 154(b) by 117 days.

(21) Appl. No.: 10/830,384

(22) Filed: Apr. 22, 2004

(65) Prior Publication Data

US 2005/0238491 A1 Oct. 27, 2005

(51) Int. Cl.
*F03D 3/02* (2006.01)

(52) U.S. Cl. ............... 416/230; 416/241 B; 29/889.71; 29/889.721

(58) Field of Classification Search ................ 415/200; 416/229 R, 229 A, 241 R, 241 A, 241 B, 416/230; 29/889.71, 889.72, 889.721
See application file for complete search history.

(56) References Cited

U.S. PATENT DOCUMENTS 3,713,753 A * 1/1973 Brunsch ..................... 416/226
3,758,233 A * 9/1973 Cross et al. ............ 416/229 R
4,519,745 A 5/1985 Rosman et al.
4,629,397 A 12/1986 Schweitzer
4,790,721 A 12/1988 Morris et al.
5,306,554 A * 4/1994 Harrison et al. ......... 428/293.4
5,358,379 A 10/1994 Pepperman et al.
5,375,978 A 12/1994 Evans et al.
5,382,453 A 1/1995 Mason
5,584,652 A 12/1996 Shaffer et al.
5,616,001 A 4/1997 Boyd
5,630,700 A 5/1997 Olsen et al.
5,640,767 A 6/1997 Jackson et al.
5,820,337 A 10/1998 Jackson et al.
5,827,045 A 10/1998 Beeck
6,000,906 A 12/1999 Draskovich
6,164,903 A 12/2000 Kouris
6,197,424 B1 3/2001 Morrison et al.
6,200,092 B1 3/2001 Koschier
6,241,469 B1 6/2001 Beeck et al.
6,325,593 B1 12/2001 Darkins, Jr. et al.
6,398,501 B1 6/2002 Darkins, Jr. et al.
6,451,416 B1 9/2002 Holowczak et al.
6,543,996 B1 4/2003 Koschier
6,746,755 B1 * 6/2004 Morrison et al. ........... 428/166

* cited by examiner

*Primary Examiner*—Edward K. Look
*Assistant Examiner*—Devin Hanan

(57) ABSTRACT

An airfoil (30) having a continuous layer of ceramic matrix composite (CMC) material (34) extending from a suction side (33) to a pressure side (35) around a trailing edge portion (31). The CMC material includes an inner wrap (36) extending around an inner trailing edge portion (38) and an outer wrap (40) extending around an outer trailing edge portion (42). A filler material (44) is disposed between the inner and outer wraps to substantially eliminate voids in the trailing edge portion. The filler material may be pre-processed to an intermediate stage and used as a mandrel for forming the outer trailing edge portion, and then co-processed with the inner and outer wraps to a final form. The filler material may be pre-processed to include a desired mechanical feature such as a cooling passage (22) or a protrusion (48). The filler material may include an upper layer (77) and a lower layer (78) separated by an intermediate layer (76) that extends to between the inner wrap and the outer wrap along the suction and/or pressure sides.

22 Claims, 3 Drawing Sheets

CERAMIC MATRIX COMPOSITE AIRFOIL TRAILING EDGE ARRANGEMENT

FIELD OF THE INVENTION

This invention relates generally to ceramic matrix composite structures and more particularly to a ceramic matrix composite airfoil such as may be used in a gas turbine engine.

BACKGROUND OF THE INVENTION

The design of the trailing edge of an airfoil is preferably dictated by aerodynamic considerations. For improved aerodynamic performance, it is commonly preferred to provide a thin trailing edge for a gas turbine airfoil. However, thinness may result in weakness, and there are often structural limitations that limit the trailing edge design and necessitate the use of an aerodynamic design that is less than optimal.

It is known to use ceramic matrix composite (CMC) materials for airfoils and other components of gas turbine engines. CMC materials advantageously provide higher temperature capability than metal and a high strength to weight ratio. However, modern gas turbine engines have operating temperatures that may exceed even the high temperature limits of known oxide and non-oxide ceramic materials. Accordingly, a layer of insulating material may be used, which further exacerbates the trailing edge thickness issue, and/or active cooling channels may be provided, which further exacerbates the strength issue.

FIG. 1 illustrates a known arrangement for an airfoil 10 fabricated with a ceramic matrix composite material. FIG. 1 is a partial sectional view of the trailing edge portion 12 of airfoil 10. An outer shell of ceramic insulating material 14, such as the material described in co-owned U.S. Pat. No. 6,013,592, defines the airfoil shape. Respective suction side and pressure side layers 16, 18 of ceramic matrix composite material provide mechanical strength for the airfoil 10. The plies of reinforcing fibers (not shown) within each of these respective layers 16, 18 extend to the very end of the trailing edge 12 and are separate from each other. No ply is wrapped continuously around from the suction side 16 to the pressure side 18, because to do so would undesirably increase the thickness T of the trailing edge due to the minimum bend radius required for the material plies. A prefabricated CMC insert 20 is positioned between the suction and pressure side layers 16, 18 in order to define cooling channels 22. Pressure from the cooling air within channels 22 results in interlaminar stresses within the CMC layers 16, 18, which is the weakest direction of such a material. In addition, stress concentrations arise from the cooling channels themselves. Increasing the thickness of the CMC layers 16, 18 to add more strength results in an increase thickness T and it further exacerbates the cooling problem, since CMC materials have a relatively low coefficient of thermal conductivity.

FIG. 2 illustrates another known arrangement for an airfoil 24 fabricated with a ceramic matrix composite material. Airfoil 24 is illustrated with an outer shell of ceramic insulating material 25, but one skilled in the art may appreciate that such a device may be used with or without such an outer protective shell. In this arrangement, the plies of CMC material 26 extend continuously around the trailing edge portion 28 of the airfoil 24 from the suction side to the pressure side. This arrangement provides increased strength against interlaminar shear stresses. To achieve a desired outer surface profile with a desirably thin trailing edge thickness, geometry dictates that the plies separate along the centerline of the trailing edge included angle if both the inner and outer plies are bent to equivalent radii. Such shape results in the creation of void spaces 29 between adjacent plies of the CMC material 26. These void spaces 29 are only partially filled with matrix material in any of several known CMC matrix processes. For example, when the reinforcing fibers of the CMC material 26 are infused with a matrix material during a known chemical vapor infiltration (CVI) process, the exposed surfaces are preferentially coated, leaving voids where the fiber surfaces are separated. Alternately, during another known process of slurry-impregnated fabric lay-up, such as used in oxide-based CMCs, the slurry may not completely fill the void spaces 29 between plies 26 in this region. Furthermore, the slurry-based matrix undergoes extensive volumetric shrinkage during drying and firing, which will leave behind voids and/or cracks in the matrix-rich regions. As a result, the strength of the trailing edge portion 28 of airfoil 24 may be compromised. Furthermore, the fibers in the trailing edge region 28 between inner and outer plies are relatively unconstrained, resulting in poor control of fibers, uneven distribution of porosity, and variable properties.

BRIEF DESCRIPTION OF THE DRAWINGS

These and other advantages of the invention will be more apparent from the following description in view of the drawings that show.

DETAILED DESCRIPTION OF THE INVENTION

Figure 3:
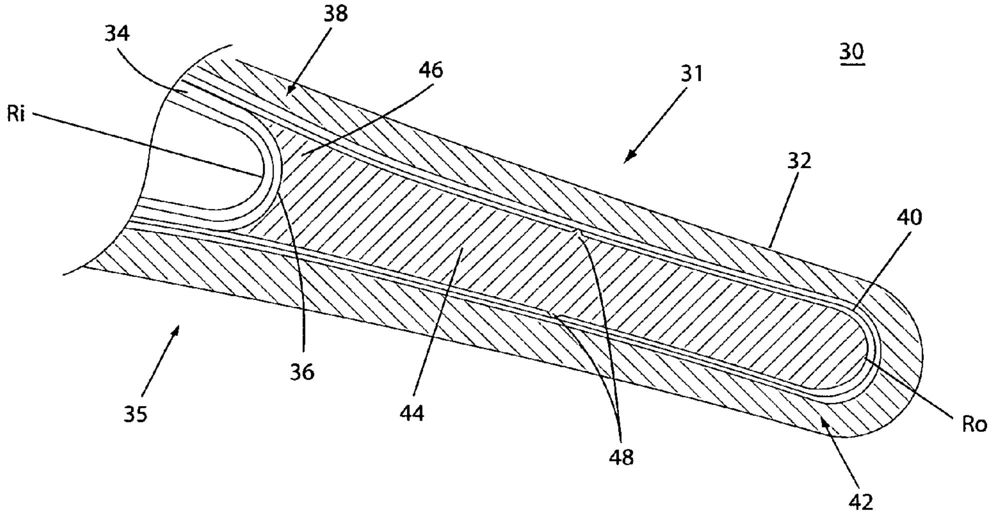
FIG. 3 is a partial cross-sectional view of a first embodiment of an improved gas turbine airfoil.

An improved CMC airfoil 30 as may be utilized in a gas turbine engine is illustrated in partial cross-section in FIG. 3. Support for an exterior insulating layer 32 that defines the airfoil shape is provided by a layer of ceramic matrix composite material 34 that extends continuously around the trailing edge portion 31 to support both the suction side 33 and the pressure side 35 of the airfoil 30. An inner wrap of plies 36 extends between the suction and pressure sides 33, 35 with a bend radius $R_i$ to form an inner trailing edge portion 38. An outer wrap of plies 40 extends between the suction and pressure sides 33, 35 with a bend radius $R_o$ to form an outer trailing edge portion 40. The inner and outer wraps 36, 38 together comprise the continuous layer of CMC material 34 along the suction and pressure sides 33, 35. Each of the inner wrap 36 and the outer wrap 38 are laid up to be sufficiently close-packed so that a process used to introduce matrix material (e.g. CVI or slurry prepreg) will completely or substantially fill all inter-fiber voids and will result in an essentially solid inner trailing edge portion 38 and outer trailing edge portion 40. A filler material 44 installed during the lay-up process is used to fill a gap region between the inner wrap of plies 36 and the outer wrap of plies 40 during the lay-up process. The filler material 44 provides substantially solid material between the inner trailing edge portion and the outer trailing edge portion, as seen in the cross-sectional view of FIG. 3. The filler material 44 may be any material that is compatible with the continuous layer of CMC 34 from a thermal expansion and a chemical reaction perspective and that can withstand the thermal environment during use of the airfoil. The filler material 44 may be the same type of material as the layer of CMC material 34 and it may be processed concurrently, or it may be a different type of material, such as a material having a higher coefficient of thermal conductivity than the CMC material 34 in order to facilitate cooling of the trailing edge portion 31.

In one fabrication method, the inner wrap 36 and outer wrap 40 are each sufficiently close-wound so that a subsequent matrix infiltration process or in-situ supplied matrix slurry substantially fills each of them, and the voids that are typically present in the trailing edge of a CMC airfoil are concentrated into a central gap region of the trailing edge. Removable or fugitive tooling may be used to define the central gap region. That gap region is then filled with filler material 44 to substantially eliminate such voids. The filler material 44 results in an essentially solid trailing edge portion 31 upon completion of the matrix impregnation process.

The terms "substantially filled" and "essentially solid" and the like are used herein to describe the condition where no structurally significant void remains following the matrix impregnation process with the exception of any purposefully formed voids such as cooling passages. For example, the airfoil 30 can be said to have an essentially solid trailing edge portion 31 as seen in the cross-section of FIG. 3, while it is recognized that another parallel cross-section of the same airfoil 30 may illustrate a cooling passage 22 that is intentionally formed through the trailing edge portion 31. The trailing edge portion 31 is made essentially solid by concentrating the inter-wrap voids into a consolidated volume and then filling that volume with filler material 44.

In another example, the filler material 44 is formed initially to its predefined shape and is then inserted into the lay-up, thus serving to define and control the compaction and geometry of the fiber plies 36, 40. The pre-processed filler material 44 is used as a mandrel for forming the outer trailing edge portion. The filler material 44 may be further pre-configured with features such as cooling passages that would otherwise require difficult or impossible post-process machining steps. More intricate features are possible using this approach, thus allowing for more effective cooling of the trailing edge 31. The filler material 44 may be formed to include a protrusion 48 of any desired shape that extends into one of the inner wrap 36 or outer wrap 38 to a predetermined depth. Furthermore, the prefabricated filler material 44 may be pre-processed to an intermediate stage and infiltrated and/or co-fired with the added fiber wraps 36, 40. In the case where the prefabricated filler 44 is partially densified or sintered, additional matrix processing steps required for the inner and outer wraps 36, 40 will serve to further densify the filler 44, thus resulting in a higher thermal conductivity material which aids in the cooling of the region.

In order to minimize the thickness of the trailing edge portion 31, the outer wrap bend radius $R_o$ may be kept at a minimum value that is consistent with proper handling of the CMC material. For typical CMC materials utilized for gas turbine airfoils, a minimum bend radius may be approximately 0.125 inches for fiber aligned with the chord of the airfoil. This minimum bend may be effectively reduced by 50% by changing the fiber angle, using lower denier fiber tows, or accepting some fiber damage in the bend radius. The inner trailing edge portion 38 is typically the region of the trailing edge portion 31 that experiences peak interlaminar stress conditions. The stress levels in this region are a function of, and are inversely proportional to, the bend radius $R_i$. Thus, it may be desired to maintain $R_i$ to be greater than $R_o$, although in some embodiment they may be the same. In one embodiment $R_o$ may be selected to be 0.125 to 0.25 inches.

Figure 4:
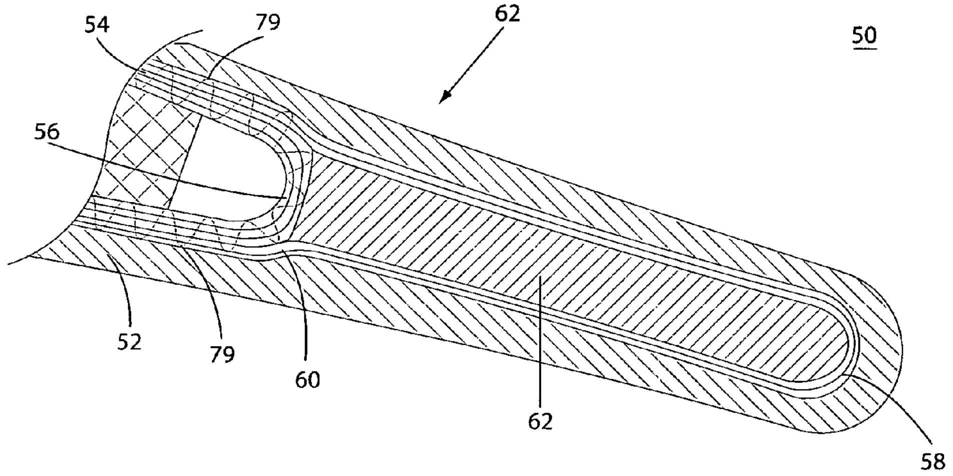
FIG. 4 is a partial cross-sectional view of a second embodiment of an improved gas turbine airfoil.

The embodiment of FIG. 3 utilizes a filler material 44 that has a generally Y-shaped cross-sectional shape. If the filler material 44 is a CMC material, progressively shorter plies must be used during the lay-up process to fill the triangular shaped regions at the junction of the inner and outer wraps 36, 40. FIG. 4 is a partial cross-sectional view of a further embodiment of an airfoil 50 having a wrapped CMC architecture. In this embodiment, an exterior shell of ceramic insulating material 52 is supported by a continuous ceramic matrix composite wrap 54 that is divided into an inner wrap portion 56 and an outer wrap portion 58. The inner wrap portion 56 and the outer wrap portion 58 come together to form the remainder of the airfoil wall, where the wall thickness of the CMC material is the sum of the thickness of the inner and outer wrap portions 56, 58. The outer wrap portion 58 is laid up to have a curved portion 60 proximate the inner trailing edge portion 62 so that the filler material 62 may be formed to have a rectangular cross-sectional shape. This eliminates the need for a Y-shaped region in the filler material. The number of plies that are included in the inner wrap portion 56 and in the outer wrap portion 58 may be the same. Alternatively as illustrated in FIG. 4, the number of plies in the outer wrap portion 58 may be less than the number of plies in the inner wrap portion 56 in order to maintain thinness in the trailing edge and strength for resisting internal cavity pressures and other forces in the region 62 of peak interlaminar stress.

Figure 1:
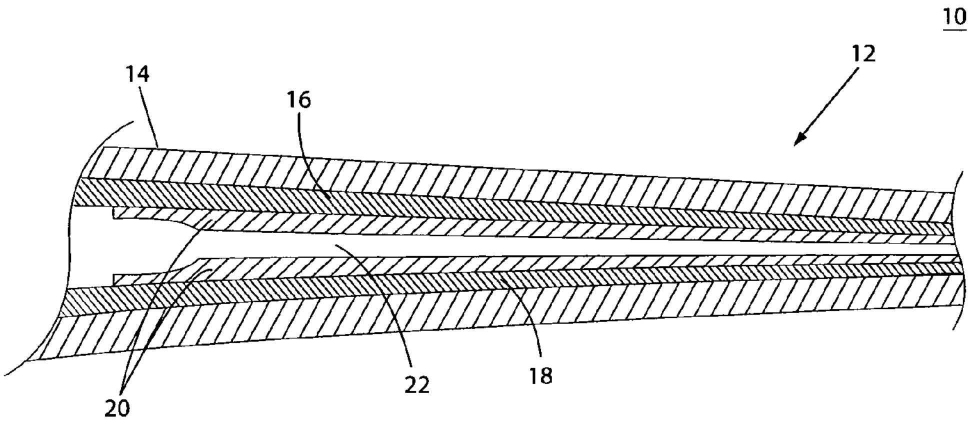
Figure 1 Prior Art
FIG. 1 is a partial cross-sectional view of a first prior art gas turbine airfoil.
Figure 2:
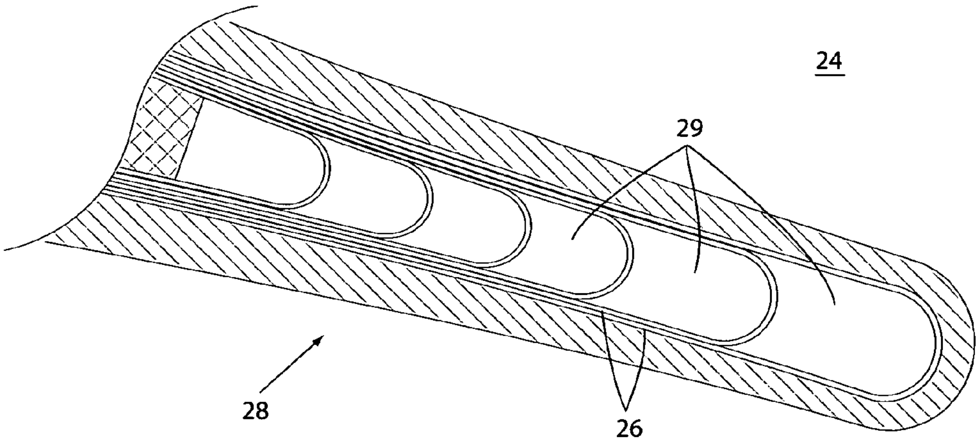
Figure 2 Prior Art
FIG. 2 is a partial cross-sectional view of a second prior art gas turbine airfoil.

The cross-sectional view of FIGS. 3 and 4 do not illustrate any cooling passage extending through the trailing edge region. One skilled in the art will appreciate that at other cross sections through these same devices there may be such a cooling passage, as shown in FIG. 1, formed by drilling or the use of a fugitive material, for example.

Figure 5:
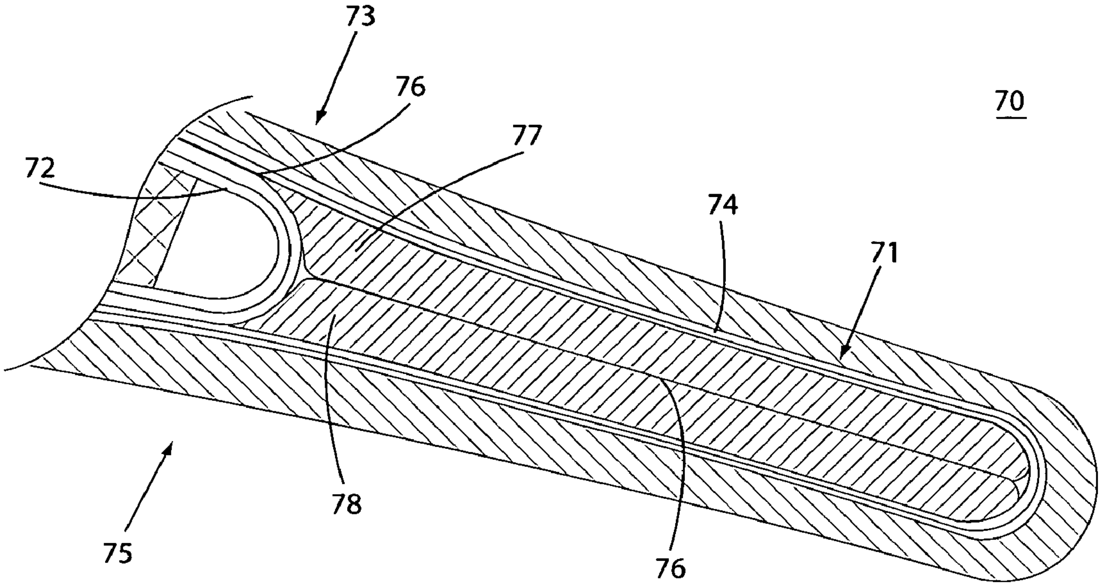
FIG. 5 is a partial cross-sectional view of a third embodiment of an improved gas turbine airfoil.

When forming the filler material of a CMC material, the filler material fiber ply orientations are not limited to being the same orientation as the inner and outer plies. For example, the filler material may be laid up to have fiber orientations that are perpendicular or transverse to those of the wrapped fibers. Multiple layers having different weaves may be used in the filler material, such as illustrated by the airfoil 70 of FIG. 5. In this embodiment, the inner wrap 72 and the outer wrap 74 are separated along at least one of the suction side 73 and pressure side 75 by an intermediate layer 76 that may be a CMC material having an alternate 2D or 3D weave, such as an Albany International Techniweave Y-Weave fabric. The intermediate layer 76 along with an upper layer 77 and a lower layer 78 of CMC material form the filler material 71 so that the intermediate layer 76 extends from between the upper layer 77 and lower layer 78 in the trailing edge portion to between the inner wrap 72 and outer wrap 74 along at least one of the suction side 73 and pressure side 75. The inner and/or outer wraps 72, 74 may be constructed of 3D weaves, 2D weaves, 2D braids, or any other known method of fiber reinforcement. The inner and outer wraps 72, 74 may or may not be of the same construction and may or may not be joined together to form an integral structure along the suction and/or pressure sides, such as by a ceramic fiber reinforcement 79 that joins the preforms together prior to matrix introduction, or by stitching together a wet prepreg lay-up, or by co-processing two layers of CMC material. The multiple layer construction serves to minimize delamination planes such as exist in certain 2D laminate construction options. Preferably, all of the plies that emanate from the airfoil body suction and pressure sides 73, 75 are wrapped around the trailing edge, either on the inner or outer portion of the trailing edge.

Figure 6:
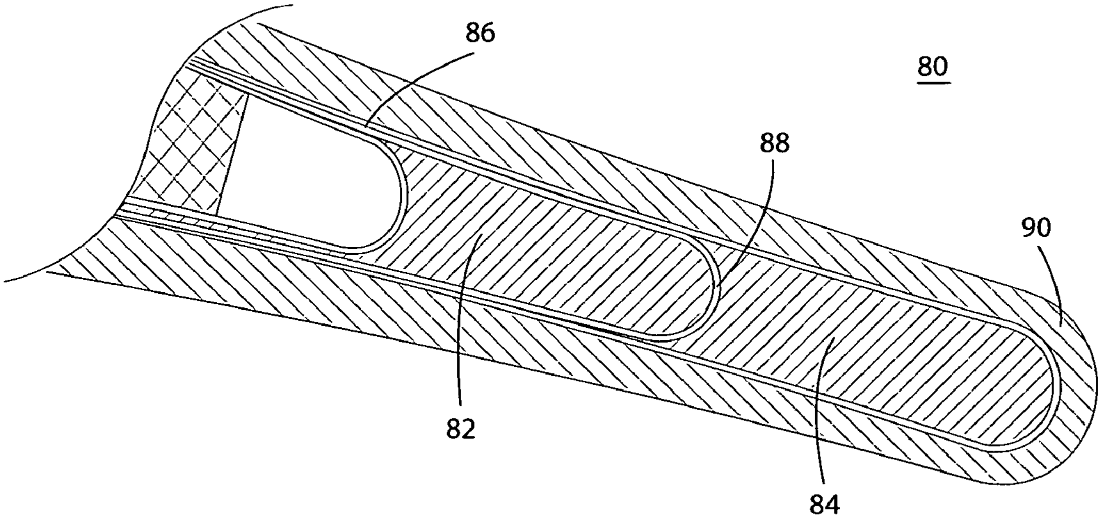
FIG. 6 is a partial cross-sectional view of a fourth embodiment of an improved gas turbine airfoil.

FIG. 6 illustrates another embodiment of an airfoil 80 wherein two regions of filler material 82, 84 are used to separate an inner wrap 86, an intermediate wrap 88, and an outer wrap 90. The fibers of each of the wraps 86, 88, 90 are closely packed so that they are completely filled with matrix material during an impregnation step, and the two regions of filler material 82, 84 ensure that the resulting trailing edge region is essentially void free except for purposefully formed spaces such as cooling passages. The first region of filler material 82 and the second region of filler material 84 have a thickness difference that is defined by the number of plies in each wrap. The two regions of filler material 82, 84 may be the formed of the same or different materials, and they may have the same or different fiber orientations if they are formed of CMC material.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. An airfoil comprising:

a suction side and a pressure side joined along a trailing edge portion;

a layer of ceramic matrix composite material extending between the suction side and the pressure side around the trailing edge portion;

the layer of ceramic composite material comprising an outer wrap of ceramic matrix composite material forming an outer trailing edge portion and an inner wrap of ceramic matrix composite material forming an inner trailing edge portion; and a region between the outer wrap and the inner wrap being substantially filled with a filler material.

2. The airfoil of claim 1, wherein the inner wrap comprises a number of plies of material greater than a number of plies of material comprising the outer wrap.

3. The airfoil of claim 1, wherein the filler material, the outer wrap and the inner wrap all comprise the same type of ceramic matrix composite material.

4. The airfoil of claim 1, wherein the filler material comprises a material having a coefficient of thermal conductivity that is greater than a coefficient of thermal conductivity of the layer of ceramic matrix composite material.

5. The airfoil of claim 1, further comprising:

the inner wrap comprising a bend radius of $R_i$;

the outer wrap comprising a bend radius of $R_o$; and $R_i$ being greater than $R_o$.

6. The airfoil of claim 1, further comprising a layer of ceramic thermal insulating material disposed over the suction side, pressure side and trailing edge portion.

7. The airfoil of claim 1, wherein the filler material comprises a generally Y-shaped cross-sectional shape.

8. The airfoil of claim 1, wherein the outer wrap comprises a curved portion proximate the inner trailing edge portion and the filler material comprises a rectangular cross-sectional shape.

9. The airfoil of claim 1, wherein the filler material comprises an upper layer and a lower layer of a first material and an intermediate layer of a second material different than the first material disposed between the upper and lower layers of the first material.

10. The airfoil of claim 9, wherein the second material extends from between the upper and lower layers of the first material in the trailing edge portion to between the outer wrap and the inner wrap along at least one of the suction side and the pressure side.

11. The airfoil of claim 1, wherein the inner wrap and the outer wrap are joined together to form an integral structure along each of the suction side and pressure side.

12. The airfoil of claim 1, wherein the continuous layer of ceramic matrix composite material further comprises an intermediate wrap disposed between the inner wrap and the outer wrap, and farther comprising:

a first region of filler material disposed between the inner wrap and the intermediate wrap within the trailing edge portion; and a second region of filler material disposed between the intermediate wrap and the outer wrap within the trailing edge portion.

13. The airfoil of claim 1, further comprising the outer wrap of ceramic matrix composite and the inner wrap of ceramic matrix composite being joined by a ceramic fiber reinforcement along at least one of the suction and pressure sides.

14. The airfoil of claim 1, further comprising a protrusion formed on the filler material and extending into one of the inner wrap and the outer wrap to a predetermined depth.

15. A method of forming an airfoil, the method comprising:

wrapping an inner wrap of ceramic matrix composite material about a radius $R_i$ to form an inner trailing edge portion between a suction side and a pressure side of an airfoil shape;

wrapping an outer wrap of ceramic matrix composite material about a radius $R_o$ to form an outer trailing edge portion between the suction side and the pressure side of the airfoil shape, the outer trailing edge portion separated from the inner trailing edge portion by a gap region;

filling the gap region with a filler material to form a substantially solid trailing edge portion.

16. The method of claim 15, further comprising joining the inner wrap and the outer wrap together to form an integral layer of ceramic matrix composite material along at least one of the suction side and the pressure side.

17. The method of claim 16, further comprising joining the inner wrap and the outer wrap together with ceramic fiber reinforcement.

18. The method of claim 15, further comprising pre-processing the filler material to at least an intermediate stage prior to filling the gap region, and co-processing the filler material, the inner wrap and the outer wrap together to a final stage.

19. The method of claim 18, further comprising using the pre-processed filler material as a mandrel for forming the outer trailing edge portion.

20. The method of claim 18, further comprising pro-processing the filler material to comprise one of a cooling passage and a protrusion feature prior to filling the gap region.

21. The airfoil of claim 1, wherein the filler material has a higher coefficient of thermal conductivity than the ceramic matrix composite material.

22. The airfoil of claim 1, wherein the flier material has a same coefficient of thermal conductivity as the ceramic matrix composite material.

* * * * *